(12) United States Patent
Schrettlinger et al.

(10) Patent No.: US 10,729,269 B2
(45) Date of Patent: Aug. 4, 2020

(54) DRIP-STOP ATTACHMENT FOR A FOOD PROCESSING DEVICE

(71) Applicant: KONINKLIJKE PHILIPS N.V., Eindhoven (NL)

(72) Inventors: Joachim Schrettlinger, Eindhoven (NL); Christian Zainitzer, Eindhoven (NL); Paula Andrea Allende Fritsch, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 419 days.

(21) Appl. No.: 15/539,180

(22) PCT Filed: Dec. 19, 2015

(86) PCT No.: PCT/EP2015/080698
§ 371 (c)(1),
(2) Date: Jun. 23, 2017

(87) PCT Pub. No.: WO2016/102409
PCT Pub. Date: Jun. 30, 2016

(65) Prior Publication Data
US 2017/0347823 A1 Dec. 7, 2017

(30) Foreign Application Priority Data
Dec. 24, 2014 (EP) .................................. 14200266

(51) Int. Cl.
*A47J 19/02* (2006.01)
*A47J 43/07* (2006.01)
(Continued)

(52) U.S. Cl.
CPC .............. *A47J 19/025* (2013.01); *A47J 19/06* (2013.01); *A47J 43/07* (2013.01); *B65D 51/04* (2013.01); *A23N 1/00* (2013.01); *B02C 18/16* (2013.01)

(58) Field of Classification Search
CPC .......... A47J 19/025; A47J 19/06; A47J 19/02; B65D 51/04; B65D 47/24; B65D 47/244;
(Continued)

(56) References Cited

U.S. PATENT DOCUMENTS 2,315,018 A * 3/1943 Lawrence ............. A47J 19/023
99/501
4,009,794 A 3/1977 Zapp
(Continued)

FOREIGN PATENT DOCUMENTS

CN 201119803 Y 9/2008
CN 101849762 A 10/2010
(Continued)

OTHER PUBLICATIONS

Braun PDF attached, pp. 1-78. Source link: http://www.braunhousehold.com/Global/InstructionManuals/M7/H4293_1_MN_AMEEpdf.
(Continued)

*Primary Examiner* — Tu B Hoang
*Assistant Examiner* — Erin E McGrath

(57) ABSTRACT

An attachment (60) for a spout (140) of a food processing apparatus (10), including a housing (70) with a liquid inlet (80), a front face (160), and a liquid outlet (100). The housing defines a posterior cavity (110) that removably receives the spout and position the liquid inlet next to the spout. The attachment also includes a drip-stop flap (150) which is attached to and covers the front face of the housing. The drip-stop flap reversibly pivots about a horizontal pivot axis between a closed position where the liquid outlet is
(Continued)

blocked by a sealing element on the flap, and an open position where the liquid outlet is exposed.

11 Claims, 7 Drawing Sheets

(51) Int. Cl.
*A47J 19/06* (2006.01)
*B65D 51/04* (2006.01)
*A23N 1/00* (2006.01)
*B02C 18/16* (2006.01)

(58) Field of Classification Search
CPC .. B65D 47/245; B65D 47/248; B65D 47/249; B65D 47/26; B65D 47/265; B65D 47/268; B02C 18/16; B67D 3/0061; B67D 3/043; B67D 3/045; B67D 3/047
See application file for complete search history.

(56) References Cited

U.S. PATENT DOCUMENTS

| | | |
|---|---|---|
| 4,621,750 A | 11/1986 | Roethel |
| 6,138,878 A | 10/2000 | Savage |
| 8,474,375 B2 | 7/2013 | Jays |
| 8,522,995 B2 | 9/2013 | Voss |
| 9,556,916 B2 | 1/2017 | Conti |
| 9,565,872 B2 | 2/2017 | Corkin |
| 2002/0179644 A1* | 12/2002 | Evans ............... B65D 47/2006 222/153.14 |
| 2007/0221689 A1 | 9/2007 | Blum |
| 2012/0291638 A1* | 11/2012 | Kim .................... A47J 19/027 99/501 |
| 2014/0190359 A1 | 7/2014 | Corkin |
| 2014/0261019 A1 | 9/2014 | Conti |
| 2016/0120353 A1 | 5/2016 | Kim |
| 2017/0347823 A1 | 12/2017 | Schrettlinger et al. |

FOREIGN PATENT DOCUMENTS

| | | |
|---|---|---|
| CN | 202191160 U | 4/2012 |
| JP | 6167111 A | 4/1986 |
| JP | 62178930 U1 | 8/1987 |
| KR | 101159177 Y | 6/2012 |
| WO | 2009010897 A2 | 1/2009 |

OTHER PUBLICATIONS

"Kuvings Wide Mouth Slow Juicer", Kuvings PDF attached. Source link: http://juicing-for-health.com/juicer-review/single-gear-juicers/kuvings-wide-mouth-slow-juicer.html.

* cited by examiner

DRIP-STOP ATTACHMENT FOR A FOOD PROCESSING DEVICE

This application is the U.S. National Phase application under 35 U.S.C. § 371 of International Application No. PCT/EP2015080698, filed on Dec. 19, 2015, which claims the benefit of International Application No. 14200266.6 filed on Dec. 24, 2014. These applications are hereby incorporated by reference herein.

FIELD OF THE INVENTION

The present disclosure is directed generally to an attachment for the spout of a food processing device to prevent liquid from dripping out of the spout.

BACKGROUND OF THE INVENTION

Fruits and vegetables have always been recognized as part of a healthy diet. However, juice extracted at home or the office from fruits and vegetables has only recently become popular. Machines that extract juice from fruits and vegetables, also known as juicers, typically include a plastic or metal housing which contains an electric motor driving a disc, screw, or other mechanism to squeeze, shred, and/or masticate food introduced to the mechanism via a food chute. The juicer will typically include a pusher that allows the user to force the food into the chute and engage with the squeezing, shredding, or masticating mechanism. As the food is processed, the pulp is pushed into a container for disposal and the juice is delivered to the user via a spout.

One of the biggest complaints from users of juicers is that the spout of the device will continue to drip or leak liquid long after the device has been deactivated. Many juicers advertise "non-drip" spout solutions that are either unable to prevent drips or are so labor intensive and time-consuming as to make them impractical. For example, these non-drip solutions include caps that must be screwed on and off the spout. Another solution is to snap or otherwise orient the spout into place, switching between a closed position and an open position. However, these non-drip solutions all have deficiencies. The screw-on cap, for example, is easy to lose during use and is both labor-intensive and time-consuming. The moveable spout, for example, can be small and difficult to maneuver, and often requires the user to get their hands dirty when flipping the wet, juice-covered spout into the non-drip position after use.

Patent Publication No. CN201119803 discloses a spout with an attachment that has a spigot and a spring that moves the spigot up and down between an open position and a closed position. However, even in the open position the spigot of the disclosed device at least partially covers the spout. Further, the user does not push different points on the spigot itself to move the spigot between the open position and the closed position, instead using a more complicated tab and spring mechanism to move it back and forth.

Accordingly, there is a need in the art for methods and apparatus that give the user a simple and clean way to prevent liquid from dripping from the spout of a food processing device when it is not in use.

SUMMARY OF THE INVENTION

The present disclosure is directed to inventive methods and apparatus for a food processing apparatus. Various embodiments and implementations herein are directed to an attachment for a food processing apparatus that prevents liquid from dripping from the spout of the food processing device when it is not in use. Using the various embodiments and implementations herein, the juicing of fruits and vegetables can be substantially improved by preventing messes and user frustration with the device.

For example, in some embodiments, the spout attachment firmly attaches to the spout and directs the flow of liquid to an outlet formed in the attachment. The attachment also includes a drip-stop flap that covers the front portion of the attachment and can pivot about a hinge between an open position and a closed position. The drip-stop flap includes a sealing element that covers and seals the mouth of the spout when the flap is in the closed position. The user can pivot the drip-stop flap between the open and closed positions simply by applying light pressure to different parts of the flap face.

Placing the drip-stop flap attachment over the spout of the food processing device provides several improvements, including preventing unwanted dripping and messes, and facilitating both ease of use and user satisfaction.

Generally in one aspect, an attachment for the spout of a food processing apparatus includes: (i) a housing with a liquid inlet and a front face with a liquid outlet, the housing defining a posterior cavity configured to removably receive at least a portion of the spout and position the liquid inlet in fluid communication with the spout; and (ii) a drip-stop flap attached to and covering the front face of the housing, the drip-stop flap including a sealing element. The drip-stop flap is configured to reversibly pivot about a horizontal axis between a closed position where the liquid outlet is blocked by the sealing element, and an open position where the liquid outlet is exposed, wherein the drip-stop flap is disposed within the housing when in the open position.

According to an embodiment, the attachment includes a tab configured to mate and align with a corresponding tab of the food processing apparatus to hold the attachment in place on the spout.

According to an embodiment, the housing defines two indentations and the drip-stop flap includes two pins, each of the pins configured to fit within a respective one of the two indentations to attach the drip-stop flap to the attachment in pivoting relation.

According to an embodiment, the sealing element comprises rubber.

According to an embodiment, the front face includes a triangular latch portion, and the drip-stop flap includes a hook, the hook configured to reversibly engage a reverse side of the triangular latch portion when the drip-stop flap is in the open position, and further configured to reversibly engage a front side of the triangular latch portion when the drip-stop flap is in the closed position. According to an embodiment the hook is flexible.

Generally in one aspect, a food processing apparatus includes a housing with a food chute, a food processing chamber, and a spout. The spout includes: (i) a liquid inlet configured to receive liquid from the food processing chamber; (ii) a front face having a liquid outlet in fluid communication with the liquid inlet; and (iii) a drip-stop flap removably attached to and covering the front face of the spout, the drip-stop flap including a sealing element, and configured to reversibly pivot about a horizontal pivot axis between a closed position where the liquid outlet is blocked by the sealing element, and an open position where the liquid outlet is exposed, wherein the drip-stop flap is disposed within the housing when in the open position.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of apparatus, systems, devices, and methods for improving the function of a food processing device. More generally, Applicants have recognized and appreciated that it would be beneficial to prevent the dripping or leaking of liquid from the spout when the device is not in use. A particular goal of utilization of embodiments of the present disclosure is to be able to prevent this unwanted dripping or leaking of liquid thereby avoiding both mess and user frustration.

In view of the foregoing, various embodiments and implementations are directed to an attachment that firmly attaches to the spout of a food processing device and directs the flow of liquid to a liquid outlet formed in the attachment. A drip-stop flap covers the front portion of the attachment and pivots between an open position and a closed position. The drip-stop flap includes a sealing element that covers and seals the mouth of the spout when the flap is in the closed position.

Figure 1:
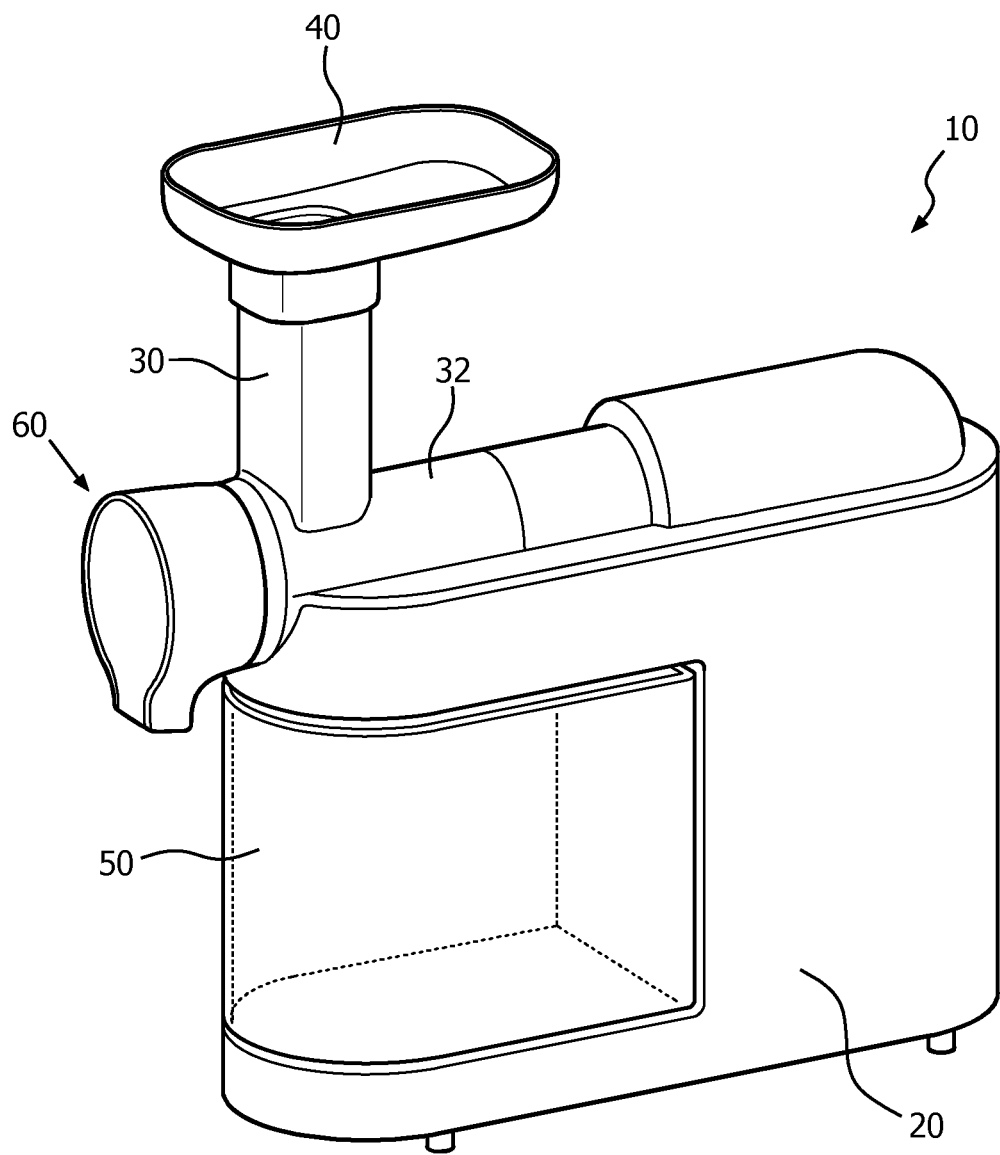
FIG. 1 is a side view of a food processor in accordance with an embodiment.

Referring to FIG. 1, in one embodiment, a food processing apparatus 10 is provided that includes a housing 20, a vertical food chute 30, a food tray 40 to hold and position food for ease of loading, a pulp receptacle 50 for receiving pulp after the liquid has been removed, and a spout attachment 60. The housing 20 can be a variety of shapes, sizes, and materials. For example, housing 20 can be made of plastic, metal, or a combination thereof, among other materials. Food processor housing 20 can be small to enclose a countertop food processor, or can be a larger to accommodate an industrial-sized food processor. The food processing apparatus can optionally include a food tray 40 to hold and position food for ease of loading food into the food chute.

A food processing chamber 32 is housed within housing 20, and is sized to receive food from the food chute 30. A food processing mechanism (not shown) such as a rotatable auger, a masher, a shredder, a slicer, or other processing mechanism is positioned within food processing chamber 32 and processes food such as fruits and vegetables. For example, in a juicer, pulp from the processed food is directed to pulp receptacle 50, and the liquid is directed to a spout.

Figure 2:
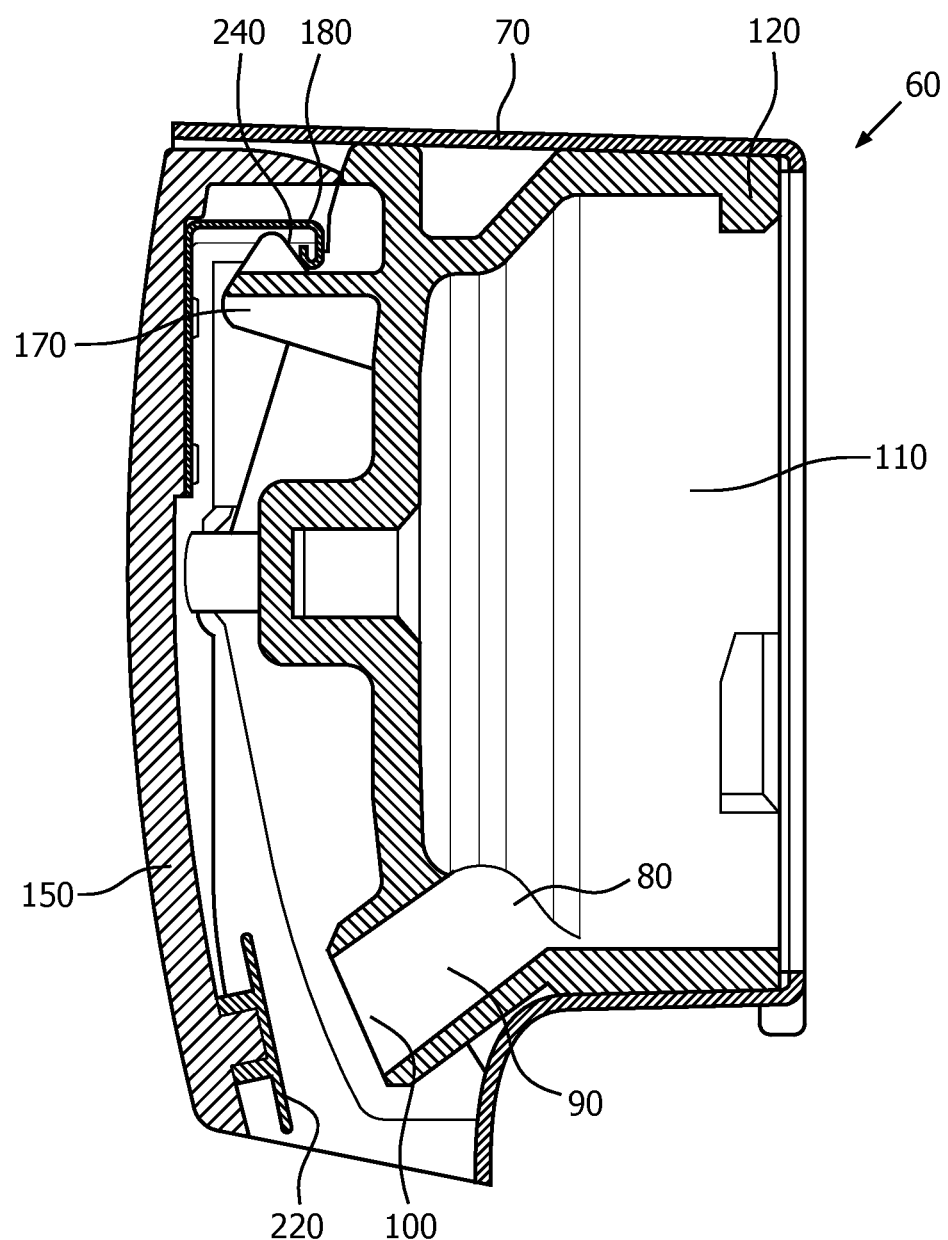
FIG. 2 is a side cutaway view of a food processor spout attachment in an open configuration in accordance with an embodiment.

Referring to FIG. 2, in one embodiment, is spout attachment 60 removed from the spout of food processing apparatus 10. Attachment 60 includes a housing 70 with a liquid inlet 80 which is in fluid communication with, and receives liquid from, the spout of food processing apparatus 10 when the attachment is affixed, connected, covering, other otherwise mated with the spout. The liquid inlet 80 is in fluid communication with a liquid outlet 100 where the liquid exits the attachment. For example, the liquid can travel through an enclosed channel 90 in the housing from liquid inlet 80 to liquid outlet 100.

Figure 3:
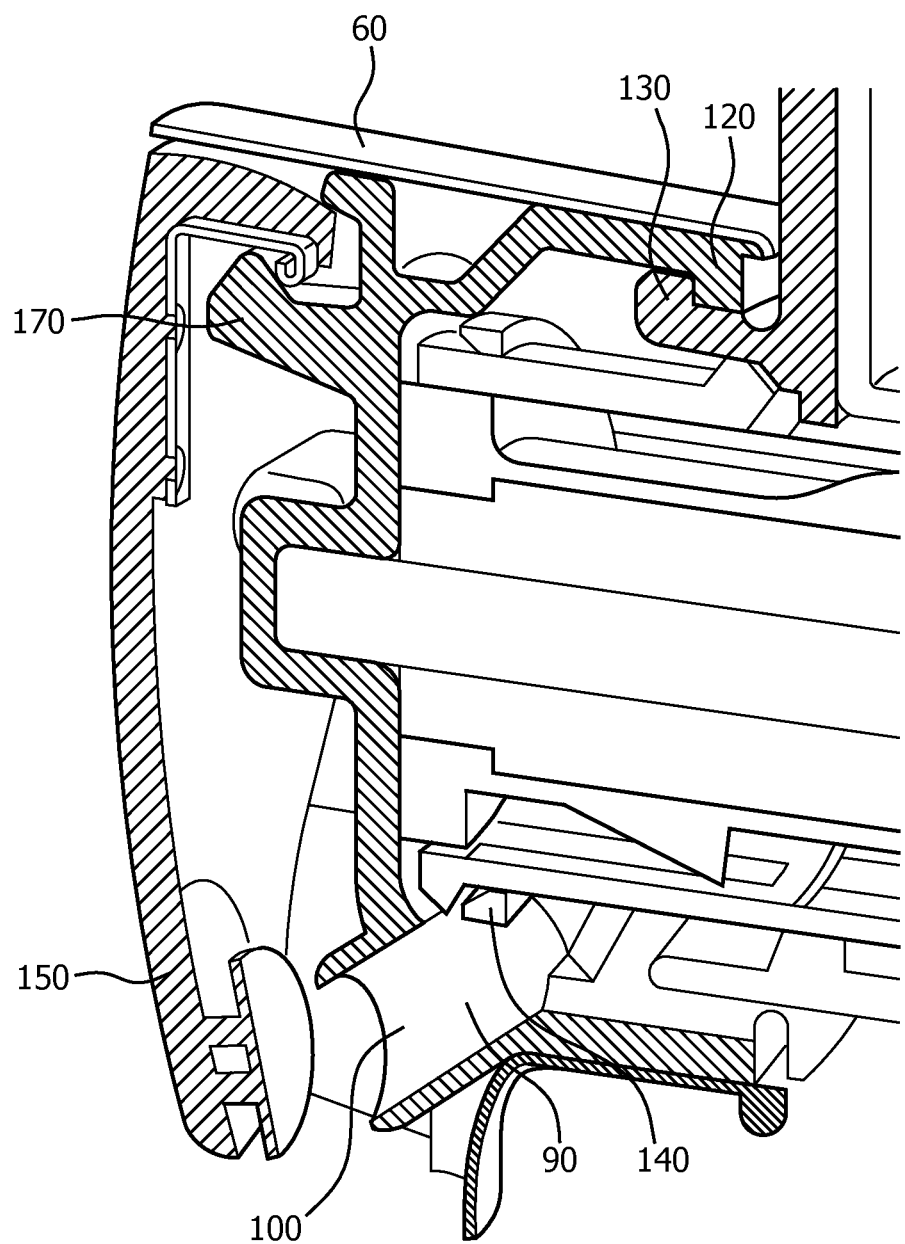
FIG. 3 is a side cutaway view of a food processor spout attachment in an open configuration in accordance with an embodiment.

The housing defines a posterior cavity 110 that is sized and shaped to receive the spout 140 of food processing apparatus 10, in order to align a liquid outlet of spout 140 with liquid inlet 80 of attachment 60 when the attachment and spout are mated and aligned as depicted in FIG. 3. Attachment 60 can be reversibly attached to the spout using a variety of attachment mechanisms known in the art. For example, the attachment can include threads that mate with threads on the spout, it can snap onto the spout, or it can snugly fit the spout, among other attachment mechanisms. According to the embodiment, the attachment includes a tab 120 that aligns and firmly snaps over tab 130 of food processing apparatus 10 in order to hold attachment 60 in place on spout 140, as shown in FIG. 3. This allows the attachment to be removed for cleaning and/or storage.

Figure 4:
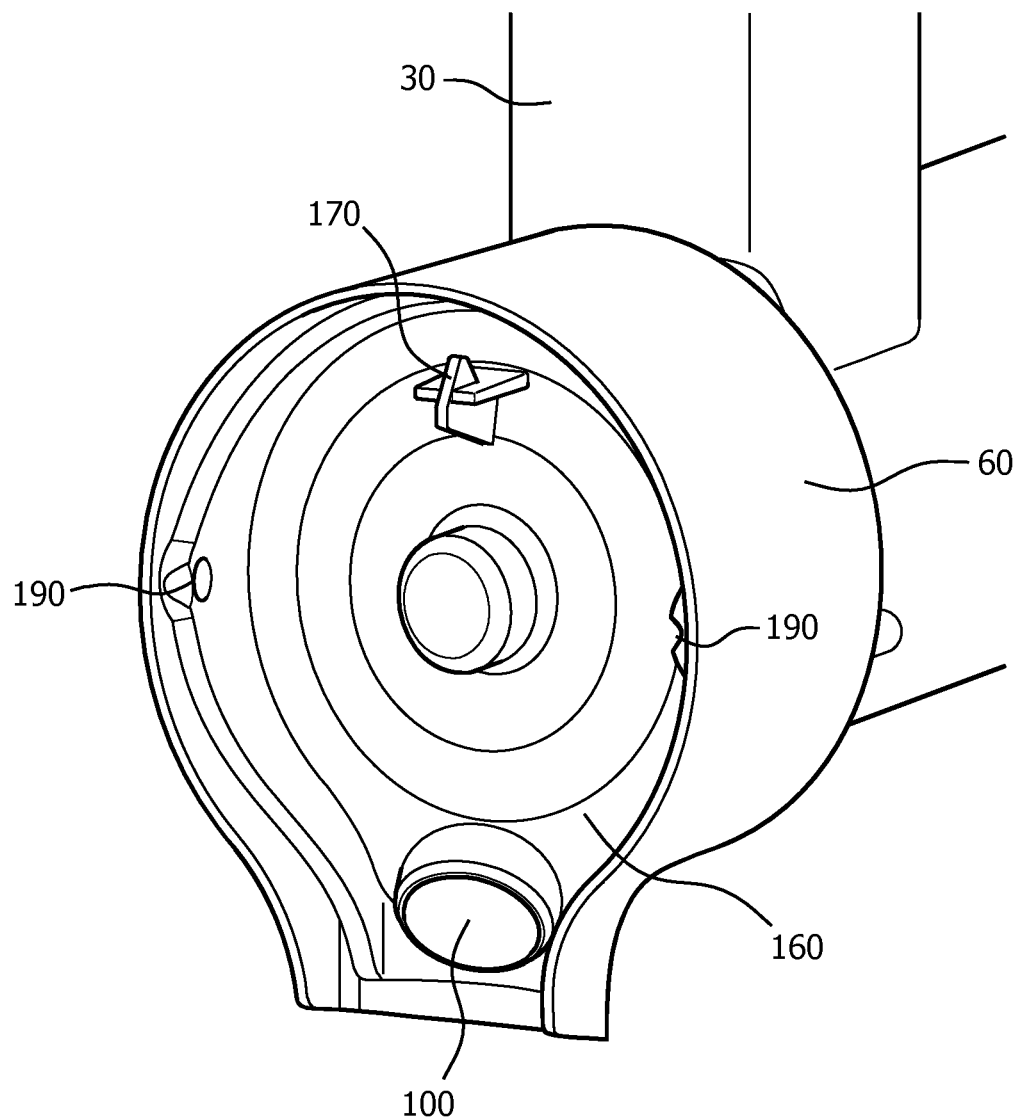
FIG. 4 is a front view of a food processor spout attachment in accordance with an embodiment.

Referring again to FIG. 2, attachment 60 includes a drip-stop flap 150. Drip-stop flap 150 can be an integral component of attachment 60, or it can be removably attached to the front face 160 of attachment 60. As shown in FIG. 4, where drip-flap 150 has been removed, the front face 160 of attachment 60 is recessed within the housing and contains the liquid outlet 100 where the liquid exits the attachment. According to this embodiment, the reverse side of front face 160 directly abuts the spout 140, and thus can be contoured to the shape of the spout. In the embodiment with a removable drip-stop flap 150 as shown in the figures, housing 70 and/or front face 160 of the attachment can also define one or more indentations 190 sized and positioned to correspond to one or more pins 200 on drip-stop flap 150. The pins are retained in a pin housing 210 with a spring (not shown) biased to push the pins outward. To install the drip-stop flap 150 on the front face, the user aligns the pins 200 with the indentations 190, and exerts a force to push the pins into the indentations, thereby reversibly holding the drip-stop flap in place. Once installed, the drip-stop flap 150 pivots about the axis formed by the two pins.

Figure 5:
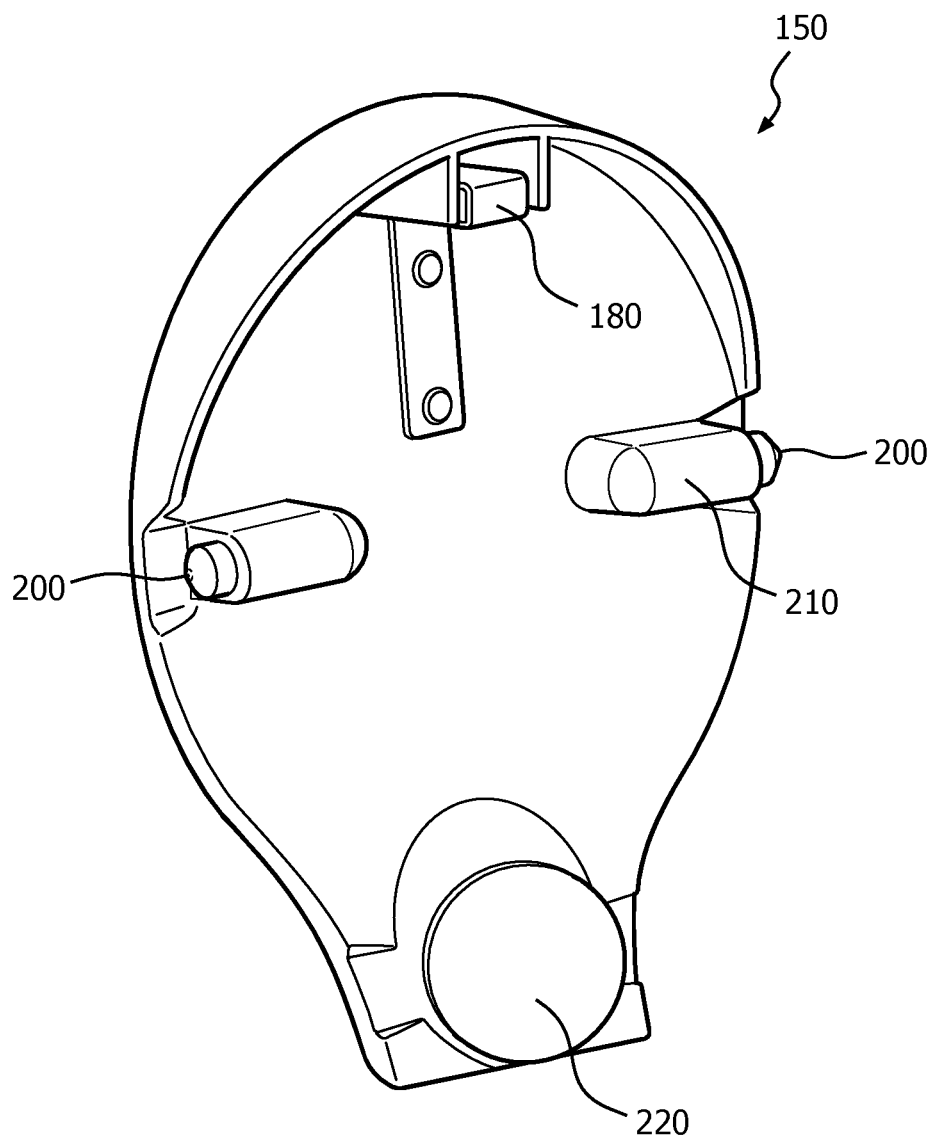
FIG. 5 is a reverse view of a drip-stop flap for a food processor spout attachment in accordance with an embodiment.
Figure 6:
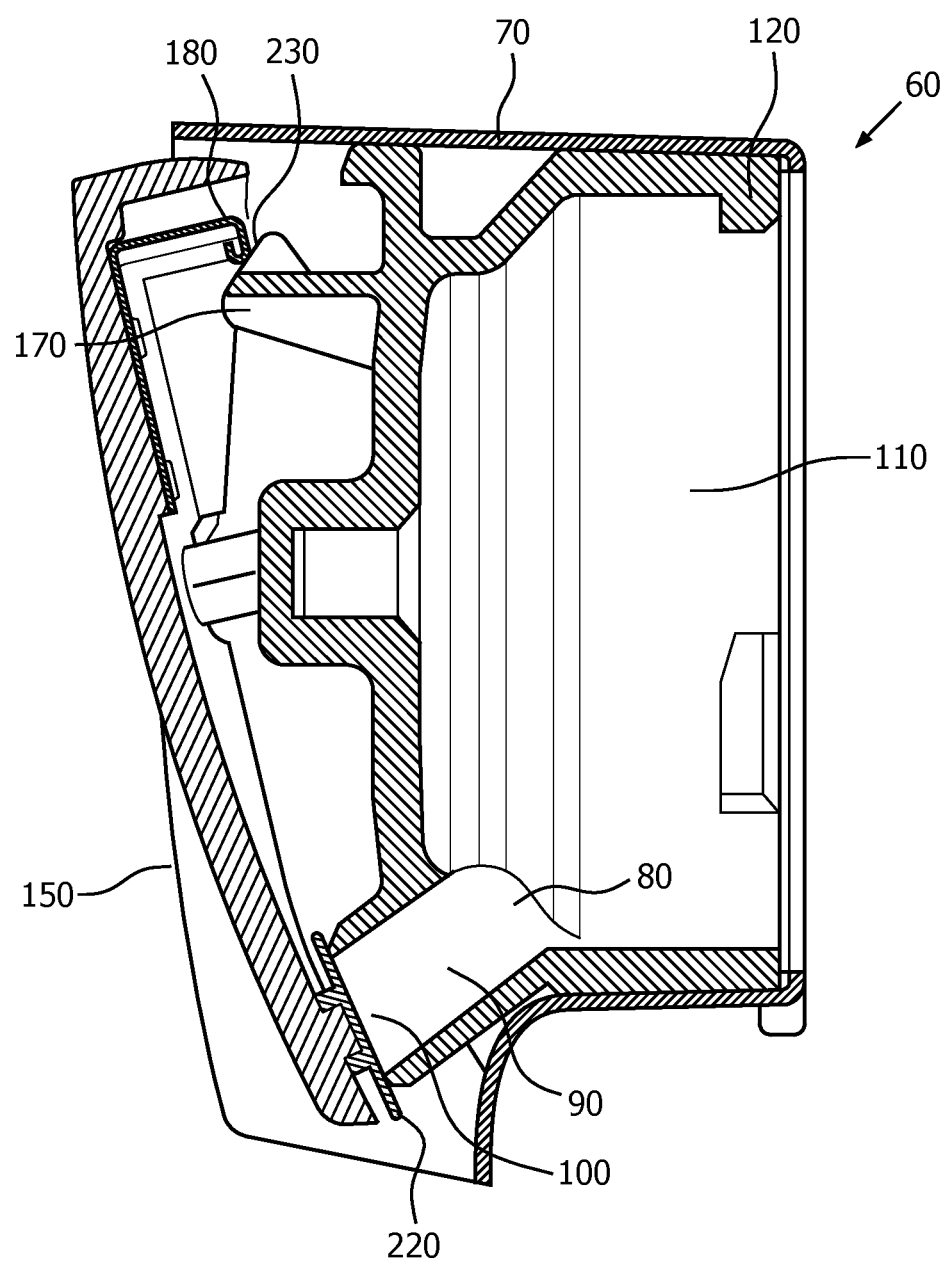
FIG. 6 is a side cutaway view of a food processor spout attachment in a closed configuration in accordance with an embodiment.

Referring to FIG. 5, drip-stop flap 150 includes a sealing element 220 that aligns with the liquid outlet 100 when the drip-stop flap is in a closed configuration, as shown in FIG. 6. When the drip-stop flap is in an open configuration, as shown in FIG. 6, sealing element 220 is located some distance away from liquid outlet 100, thereby allowing the liquid to drip or flow from the device. Sealing element 220 can be any material suitable for forming a fluid-tight seal with liquid outlet 100 to prevent liquid from leaking, including rubber, a plastic polymer, or other seal-forming materials.

According to an embodiment, drip-stop flap 150 includes a closing mechanism to exert a closing force on the flap, thereby pushing the sealing element 220 against the liquid outlet 100 and further prevent liquid from leaking. The closing mechanism can also assist in keeping the flap in the open configuration. The closing mechanism is depicted with the drip-stop flap in the open configuration in FIG. 2, with a triangular latch 170 formed on the front face 160 of the attachment and a corresponding flexible hook 180 extending from drip-stop flap 150 (see FIG. 5). In this open configuration, flexible hook 180 is engaged with the reverse side 240 of the triangular latch 170, thereby retaining the drip-stop flap 150 in this open configuration until sufficient force is exerted on the flap causing flexible hook 180 to flex slightly and move to the front side of the triangular latch 170, pulling the drip-stop flap 150 into the closed configuration as shown in FIG. 6. With the hook 180 on the front side 230 of the triangular latch 170, a force is exerted on the flap to keep it in the closed position, pushing the sealing element 220 against the liquid outlet 100 and preventing liquid from leaking. Drip-stop flap 150 will stay in this closed configuration until sufficient force is exerted on the flap causing flexible hook 180 to flex slightly and move back to reverse side 240 of the triangular latch, pulling the drip-stop flap 150 into the open configuration as shown in FIG. 2.

Figure 7:
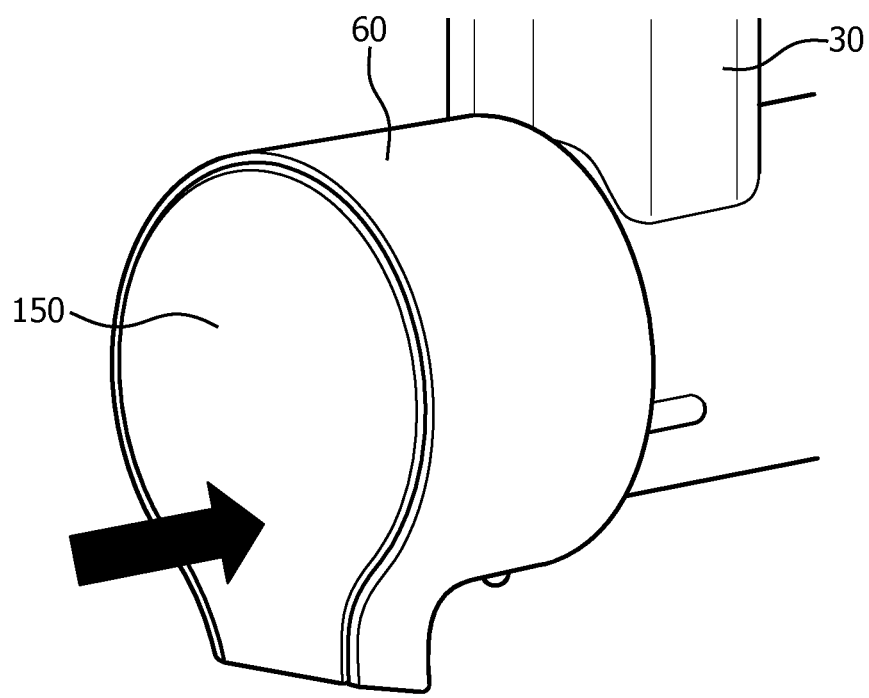
FIG. 7 is a front view of a food processor spout attachment in an open configuration in accordance with an embodiment.
Figure 8:
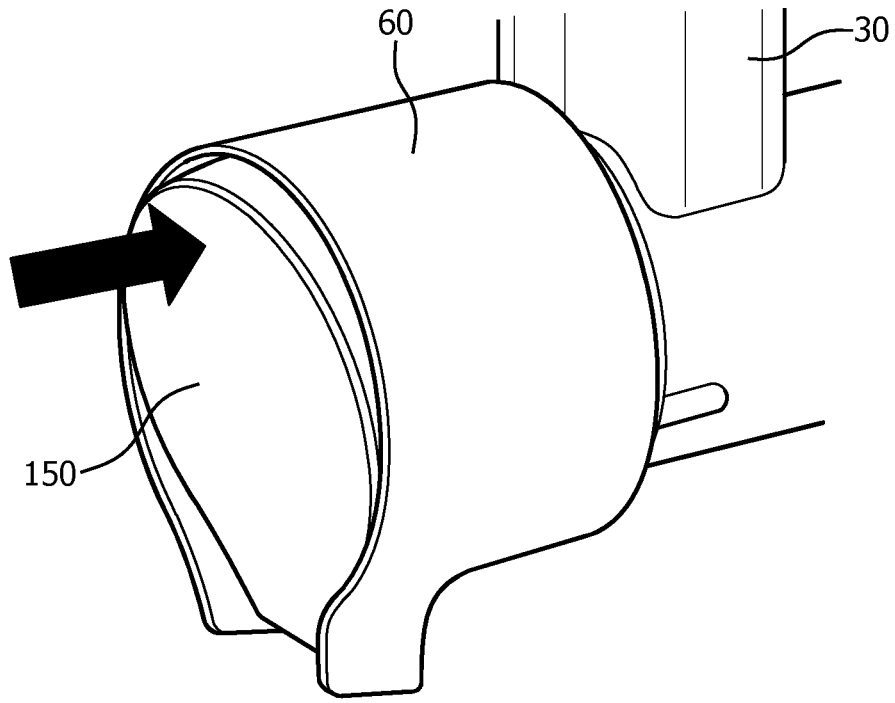
FIG. 8 is a front view of a food processor spout attachment in a closed configuration in accordance with an embodiment.

Referring to FIG. 7, the drip-stop flap 150 is in the open configuration. To pivot the flap into the closed position, a force is exerted by the user on the region denoted by the arrow. Once in the closed configuration in FIG. 8, in which the sealing element is abutting the liquid outlet and preventing leaking, force is exerted by the user on the region denoted by the arrow in order to pivot the flap into the open position shown in FIG. 7. In the open position depicted in FIG. 7, the drip-stop flap 150 is disposed within the housing 70, and sealing element 220 is located some distance away from liquid outlet 100, thereby allowing the liquid to drip or flow from the device.

Although the drip-stop flap 150 shown in the figures covers the entire front face of the attachment, it could be sized much smaller to accommodate force exerted by just a single fingertip, as an example. In such an embodiment the drip-stop flap 150 will comprise just a portion of the front face of the attachment, and can be located near the liquid outlet of the attachment such that the pivoting rotation of the flap between the open and closed configurations will move the sealing element into sealing and open positions with the liquid outlet.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An attachment for a spout of a food processing apparatus, the attachment comprising:
   a housing that includes a front portion with a front face recessed within the front portion, wherein the front face comprises a liquid outlet disposed in a lower region of the front face, the housing further including a posterior cavity with a liquid inlet, wherein the liquid inlet is in fluid communication with the liquid outlet via an enclosed channel, wherein the posterior cavity is configured to removably receive at least a portion of the spout and position the liquid inlet in fluid communication with the spout; and
   a drip-stop flap attached to and covering the front face of the housing, wherein the drip-stop flap includes a sealing element disposed on a rear side thereof and wherein the drip-stop flap is configured to reversibly pivot about a horizontal axis between (i) closed position for blocking the liquid outlet with the sealing element, further wherein the drip-stop flap is disposed partially outside of and partially within the front portion of the housing when in the closed position, and (ii) an open position for unblocking the liquid outlet in which the sealing element is spaced apart from the liquid outlet, leaving the liquid outlet exposed, further wherein the drip-stop flap is disposed completely within the front portion of the housing when in the open position.

2. The attachment of claim 1, wherein the housing further comprises a tab disposed within and protruding downward into an upper region of the posterior cavity, wherein the tab is configured to mate and align with a corresponding tab extending from an upper region of the spout of the food processing apparatus to hold the attachment in place on the spout in response to mating the tab with the corresponding tab.

3. The attachment of claim 1, wherein the housing defines two indentations and the drip-stop flap comprises two pins, each of the pins configured to fit within a respective one of the two indentations to attach the drip-stop flap to the attachment in pivoting relation.

4. The attachment of claim 1, wherein the sealing element comprises rubber.

5. The attachment of claim 1, wherein the front face further includes a triangular latch portion extending from a surface of the front face, and further wherein the drip-stop flap comprises a hook, wherein the hook is configured to reversibly engage (i) reverse side of the triangular latch portion in response to the drip-stop flap being moved into the open position, the reverse side facing the front face, and (ii) front side of the triangular latch portion in response to the drip-stop flap being moved into the closed position, the front side facing away from the front face.

6. The attachment of claim 5, wherein the hook is flexible.

7. A food processing apparatus, comprising:
   a housing that comprises a food chute, a food processing chamber, and a spout, wherein the spout comprises:
   a liquid inlet configured to receive liquid from the food processing chamber;
   a front face recessed within a front portion of the spout, wherein the front face comprises a liquid outlet disposed in a lower region of the front face, wherein the liquid outlet is in fluid communication with the liquid inlet via an enclosed channel; and
   a drip-stop flap removably attached to and covering the front face of the spout, wherein the drip-stop flap includes a sealing element disposed on a rear side thereof and wherein the drip-stop flap is configured to reversibly pivot about a horizontal pivot axis between (i) closed position for blocking the liquid outlet with the sealing element, further wherein the drip-stop flap is disposed partially outside of and partially within the front portion of the spout when in the closed position, and (ii) an open position for unblocking the liquid outlet in which the sealing element is spaced apart from the liquid outlet, leaving the liquid outlet exposed, further wherein the drip-stop flap is disposed completely within the front portion of the spout when in the open position.

8. The food processing apparatus of claim 7, wherein the front portion of the spout defines two indentations, and further wherein the drip-stop flap comprises two pins, each of the pins configured to fit within a respective one of the two indentations to attach the drip-stop flap to the front portion of the spout in pivoting relation.

9. The food processing apparatus of claim 7, wherein the sealing element comprises rubber.

10. The food processing apparatus of claim 7, wherein the front face further includes a triangular latch portion extending from a surface of the front face, and further wherein the drip-stop flap comprises a hook, wherein the hook is configured to reversibly engage (i) reverse side of the triangular latch portion in response to the drip-stop flap being moved into the open position, the reverse side facing the front face, and (ii) engage a front side of the triangular latch portion in response to the drip-stop flap being moved into the closed position, the front side facing away from the front face.

11. The food processing apparatus of claim 10, wherein the hook is flexible.

* * * * *